US008968071B2

(12) United States Patent
Tessmer et al.

(10) Patent No.: US 8,968,071 B2
(45) Date of Patent: Mar. 3, 2015

(54) METHOD AND SYSTEM FOR WEIGHTING ODDS TO SPECIFIC GAMING ENTITIES IN A SHARED BONUS EVENT

(75) Inventors: Michael T. Tessmer, Bozeman, MT (US); Lee E. Cannon, Bozeman, MT (US); Charlotte S. Centuori, Henderson, NV (US); Alan D. Williams, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1900 days.

(21) Appl. No.: 11/669,013

(22) Filed: Jan. 30, 2007

(65) Prior Publication Data

US 2007/0123341 A1 May 31, 2007

Related U.S. Application Data

(63) Continuation of application No. 10/005,213, filed on Dec. 4, 2001, now Pat. No. 7,169,041.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/3244* (2013.01); *G07F 17/3267* (2013.01)

USPC .................. 463/20; 463/25; 463/26; 463/27; 463/28

(58) Field of Classification Search

CPC ................................................... G07F 17/3258

USPC .................. 463/16, 25–27, 40–42; 273/138.1

See application file for complete search history.

(56) References Cited

U.S. PATENT DOCUMENTS

| | | | |
|---|---|---|---|
| 4,339,798 | A | 7/1982 | Hedges et al. |
| 4,582,324 | A | 4/1986 | Koza et al. |
| 4,669,731 | A | 6/1987 | Clarke |
| 4,679,143 | A | 7/1987 | Hagiwara |
| 4,695,053 | A | 9/1987 | Vazquez, Jr. et al. |
| 4,817,951 | A | 4/1989 | Crouch et al. |
| 4,837,728 | A | 6/1989 | Barrie et al. |
| 4,856,787 | A | 8/1989 | Itkis |

(Continued)

FOREIGN PATENT DOCUMENTS

| | | |
|---|---|---|
| WO | WO 98/00210 | 1/1998 |
| WO | WO 00/20082 | 4/2000 |

(Continued)

OTHER PUBLICATIONS

Scarne, *Scarne's New Complete Guide to Gambling*, 1974, Simon & Schuster, 162-167.

(Continued)

*Primary Examiner* — Kevin Y Kim

(74) *Attorney, Agent, or Firm* — Neal, Gerber & Eisenberg LLP

(57) ABSTRACT

Methods of weighting odds in shared bonus events and gaming systems and devices configured for weighting odds in shared bonus events. A number of participations or entries by the same gaming machine or player entity may be obtained for a shared bonus event in association with play of a base or primary game, allowing the odds of winning the shared bonus event to be weighted.

42 Claims, 4 Drawing Sheets

(56) References Cited

U.S. PATENT DOCUMENTS 4,871,171 A 10/1989 Rivero
5,083,271 A 1/1992 Thacher et al.
5,129,652 A 7/1992 Wilkinson
5,152,529 A 10/1992 Okada
5,186,460 A 2/1993 Fongeallaz et al.
5,242,163 A 9/1993 Fulton
5,265,874 A 11/1993 Dickinson et al.
5,275,400 A 1/1994 Weingardt et al.
5,288,081 A 2/1994 Breeding
5,290,033 A 3/1994 Bittner et al.
5,393,057 A 2/1995 Marnell, II
5,397,125 A 3/1995 Adams
5,417,430 A 5/1995 Breeding
5,472,197 A 12/1995 Gwiasda et al.
5,544,892 A 8/1996 Breeding
5,560,603 A 10/1996 Seelig et al.
5,564,701 A 10/1996 Dettor
5,580,309 A 12/1996 Piechowiak et al.
5,611,730 A 3/1997 Weiss
5,645,486 A 7/1997 Nagao et al.
5,655,961 A 8/1997 Acres et al.
5,664,998 A 9/1997 Seelig et al.
5,758,875 A 6/1998 Giacalone, Jr.
5,761,647 A 6/1998 Boushy
5,769,716 A 6/1998 Saffari et al.
5,779,242 A 7/1998 Kaufmann
5,779,544 A 7/1998 Seelig et al.
5,779,549 A 7/1998 Walker et al.
5,796,716 A 8/1998 Smith
5,806,045 A 9/1998 Biorge et al.
5,816,918 A 10/1998 Kelly et al.
5,820,460 A 10/1998 Fulton
5,823,874 A 10/1998 Adams
5,833,536 A 11/1998 Davids et al.
5,851,148 A 12/1998 Brune et al.
D404,436 S 1/1999 McGahn et al.
5,855,515 A 1/1999 Pease et al.
5,876,284 A 3/1999 Acres et al.
5,902,184 A 5/1999 Bennett
5,902,983 A 5/1999 Crevelt et al.
5,911,418 A 6/1999 Adams
5,919,088 A 7/1999 Weiss
5,924,927 A 7/1999 Matsuura et al.
5,935,000 A 8/1999 Sanchez, III et al.
5,941,772 A 8/1999 Paige
5,947,820 A 9/1999 Morro et al.
5,951,397 A 9/1999 Dickinson
5,976,015 A 11/1999 Seelig et al.
5,980,384 A 11/1999 Barrie
5,984,779 A * 11/1999 Bridgeman et al. ............ 463/16
5,993,316 A 11/1999 Coyle et al.
5,997,400 A 12/1999 Seelig et al.
6,012,982 A 1/2000 Piechowiak et al.
6,012,983 A 1/2000 Walker et al.
6,019,374 A 2/2000 Breeding
6,039,648 A 3/2000 Guinn et al.
6,048,269 A 4/2000 Burns et al.
6,077,162 A 6/2000 Weiss
6,082,887 A 7/2000 Feuer et al.
6,089,975 A 7/2000 Dunn
6,089,976 A 7/2000 Schneider et al.
6,089,978 A 7/2000 Adams
6,102,400 A 8/2000 Scott et al.
6,110,043 A 8/2000 Olsen
6,113,098 A 9/2000 Adams
6,120,378 A 9/2000 Moody et al.
6,128,550 A 10/2000 Heidel et al.
6,135,885 A 10/2000 Lermusiaux
6,146,273 A 11/2000 Olsen
6,159,095 A 12/2000 Frohm et al.
6,159,097 A 12/2000 Gura
6,165,070 A 12/2000 Nolte et al.
6,165,071 A 12/2000 Weiss
6,165,072 A 12/2000 Davis et al.
6,168,521 B1 1/2001 Luciano et al.
6,186,893 B1 2/2001 Walker et al.
6,190,255 B1 2/2001 Thomas et al.
6,203,010 B1 3/2001 Jorasch et al.
6,206,782 B1 3/2001 Walker et al.
6,210,275 B1 4/2001 Olsen
6,210,276 B1 4/2001 Mullins
6,210,277 B1 4/2001 Stefan
6,224,482 B1 5/2001 Bennett
6,224,484 B1 5/2001 Okuda et al.
6,224,486 B1 5/2001 Walker et al.
6,231,445 B1 5/2001 Acres
6,238,287 B1 5/2001 Komori et al.
6,287,202 B1 9/2001 Pascal et al.
6,302,794 B1 10/2001 Ogawa
6,309,299 B1 10/2001 Weiss
6,309,307 B1 10/2001 Krause et al.
6,336,862 B1 * 1/2002 Byrne ............................ 463/27
6,364,765 B1 4/2002 Walker et al.
6,375,567 B1 4/2002 Acres
6,416,409 B1 * 7/2002 Jordan ............................ 463/27
6,425,828 B2 7/2002 Walker et al.
6,508,709 B1 1/2003 Karmarkar
6,582,307 B2 6/2003 Webb
6,585,589 B2 7/2003 Okuniewicz
6,786,824 B2 * 9/2004 Cannon ........................... 463/42
2001/0036855 A1 11/2001 DeFrees-Parrott et al.
2002/0039923 A1 4/2002 Cannon et al.
2003/0060264 A1 3/2003 Chilton et al.
2003/0087691 A1 5/2003 Kiely et al.

FOREIGN PATENT DOCUMENTS

WO WO 01/10523 2/2001
WO WO 01/91075 11/2001
WO WO 02/096528 12/2002

OTHER PUBLICATIONS

Take Your Pick, Strictly Slots (Mar. 2001).
Instant Slotto, Strictly Slots (Apr. 2001).
EZ-Pay Ticket System Brochures, IGT (at least 2000).
IGT Gaming System Brochures, IGT (at least 2001).
Raining Diamonds Advertisement, Sierra Design Group (2001).
Silver Strike Advertisement and Pictures, Anchor Gaming (1997).

* cited by examiner

METHOD AND SYSTEM FOR WEIGHTING ODDS TO SPECIFIC GAMING ENTITIES IN A SHARED BONUS EVENT

This application is a continuation of U.S. application Ser. No. 10/005,213, filed Dec. 4, 2001, now U.S. Pat. No. 7,169,041, which is hereby incorporated by reference in its entirety in the present application.

BACKGROUND OF THE INVENTION

1. Field of the Invention

The present invention is directed to methods of playing games of chance and gaming systems for conducting shared bonus events in a manner to weight the odds among participating gaming entities according to qualifying activities associated with playing a base or primary game.

2. State of the Art

Games of chance have been enjoyed by people for thousands of years and have enjoyed widespread popularity in recent times. Many people enjoy playing variations of games that they have not previously played before. Playing new variations of games adds to the excitement of this recreational activity particularly when some form of gaming is involved. As used herein, the terms "gaming" and "gaming devices" are used to indicate that some form of wagering is involved and that players must make wagers of value, whether actual currency or some equivalent of value, e.g., token or credit.

Players involved in games of wagering often enjoy new games or variations of old games with relatively simple rules that can be readily learned by a beginner or casual player. Variations to a game with respect to the method of wagering and the ability to increase winnings attract more players and are highly desired in the industry. The ability to increase winnings where risk is involved based on the selection of a possible random outcome is also highly desired. There has been an evolution of gaming devices over the past few decades. At the beginning of this evolution stand-alone, mechanical and electromechanical gaming devices, such as the traditional slot machine, dominated the industry. The advent of relatively inexpensive computer processors and associated video display devices supported by sophisticated hardware and software to drive same has allowed the introduction of computer-emulated games and a simulated display of the game sequence and outcome. The next evolutionary step was the integration of communication capabilities between computers and gaming devices, allowing the interchange of data between computers using a communication link in the form of a network.

The development of communications capability between gaming machines and between gaming machines and a host computer over a network permitted the development of systems allowing the players at linked gaming machines to compete for additional prizes while playing traditional wagering games. Exemplary of these systems are conventional progressive gaming systems, such as those disclosed in U.S. Pat. No. 4,837,728 and U.S. Pat. No. 5,855,515, the disclosures of each of which patents are incorporated herein by reference. In a progressive system, a number of gaming machines are linked together, an additional or bonus game is made available responsive to a preselected outcome, and in many instances a threshold wager is made, in the base or primary game on the gaming machine. The potential bonus prize increases in value as wagers are placed on the linked gaming machines and a portion of each wager is diverted to the progressive prize pool until a progressive win is triggered at one of the participating gaming machines.

One progressive gaming system of note is disclosed in U.S. Pat. No. 5,645,486, the disclosure of which is incorporated herein by reference. In this system, a number of gaming machines are linked together and a progressive bonus prize is accumulated and available to players. To qualify for the progressive bonus prize, a player must obtain (for example) in play of a video poker game with a maximum wager of five coins, a combination of symbols on the screen of a gaming machine representing a royal flush hand of poker cards. When a player obtains the royal flush but has not placed the maximum wager of five coins, that player obtains an opportunity to be awarded the progressive bonus prize through a lottery. The odds of winning the lottery are related to the number of coins wagered less than the maximum. Should an "entry" to the lottery held by the player be randomly selected in lottery play, the progressive bonus is awarded. As with other progressive systems, each coin drop freezes the amount of the possible bonus payable for that game. When a player wins the lottery, the available amount of the progressive bonus is awarded and the progressive game restarts. While players are attracted to play when larger progressive bonuses accumulate, after an award of a significant bonus interest in playing the linked gaming machines can wane. Further, as each coin drop represents a chance to acquire the progressive bonus, no advantage is obtained by a player by continuing play or by obtaining certain results during play toward achieving the progressive bonus payout.

A current enhancement to the market is the addition of secondary or bonus games (as opposed to bonus prizes associated with play of a game in which lesser prizes may be won) to gaming machines offering play of a base or primary game. These gaming machines allow a player achieving a preselected outcome during play of a base or primary game to participate in an additional or "bonus" game and thereby have a chance to earn an additional payout or bonus prize. The bonus game is typically a single event or a sequential event where progress through the bonus game is determined by the continuation of play on the slot machine. Examples of such bonus games are disclosed in U.S. Pat. No. 6,089,978, U.S. Pat. No. 6,089,976 and U.S. Pat. No. 5,796,716, the disclosures of each of which are incorporated herein by reference. These bonus games begin when a selected random event occurs in a primary game on a gaming machine. The bonus game is then activated and begins. At the end of the game, an indicated payout value is awarded as a bonus. The games disclosed in the aforementioned patents respectively employ a prize wheel that spins, a number of computer generated options that are selected to receive bonuses until an end game signal is reached, or a dexterity or skill based video game. The starting point and ending point of each bonus game determines the value of the bonus prizes that may be awarded. The odds of winning each bonus of the randomly determined outcome bonus games remain the same for each occurrence of the game.

U.S. Pat. No. 6,159,097 discloses a gaming machine offering a basic game and a bonus game. In one embodiment, the probability of winning certain ones of a plurality of bonus payouts varies in response to different basic game outcomes which initiate the bonus game. In another embodiment, the bonus game includes a number of player-selectable elements, at least one of which represents a winning bonus game outcome. The value of the bonus payout successively decreases as the number of non-winning elements selected by the player increases before a winning element is selected.

U.S. Pat. No. 5,129,652, the disclosure of which is incorporated herein by reference, discloses a method of using a drawing to encourage customers to visit a casino or a related casino. Upon entering the casino, a customer fills out a card. A drawing of cards is held to award prizes to customers in the casino. A portion of the card is retained and allows for discounts on services or other additional inducements. Eligibility for drawings is maintained by staying at the casino or visiting a related casino and additional prizes become available to those who return to a participating casino within a certain time span. This method requires a player to spend additional time filling out forms, checking results and visiting alternative casinos to improve their odds. Casual players may choose not to participate to save the time and effort involved and the distraction caused by drawings unrelated to the current activity of a player may reduce the amount of time that player spends gaming.

The networking of computers has also allowed and improved the ability to track the usage of individual gaming machines including the players using such a machine. Player tracking systems allow for the management of large numbers of gaming machines and players simultaneously. Examples of player tracking systems may be found in U.S. Pat. No. 6,165,071, U.S. Pat. No. 6,048,269, and U.S. Pat. No. 5,655,961, the disclosures of each of which are incorporated herein by reference. These systems allow players to carry credits from one gaming machine to another, thereby avoiding the use of coins or tokens, to track the gaming usage of the players for marketing purposes, and to allow the players to play for a higher payout upon meeting certain conditions. U.S. Pat. No. 6,165,071 discloses the use of player tracking to allow gaming to transpire over a series of sessions without a player losing credit for performances in earlier sessions.

It would be desirable to encourage players to continue their play on a gaming machine by providing prizes that are available through a shared bonus event. It would be particularly desirable to weight each player's odds of winning a shared bonus event prize in a manner proportionate to the player's time spent playing a base or primary game, wagers made during play thereof, success at playing a base or primary game, or other activity associated with play of a base or primary game through which one qualifies to enter or participate in the shared bonus event. It may be further desirable for such a system to allow a player to retain any unused entries for a shared bonus event remaining at the end of a period of play of a primary or base game and use those entries in a later session of play or to allow a player to be awarded a shared bonus event prize after ending play and then claim the prize in a later session of play, thus encouraging players to return later.

BRIEF SUMMARY OF THE INVENTION

The present invention comprises a method of playing a game of chance wherein a predetermined activity associated with play of a base or primary game on a gaming machine, which may also be termed a gaming device or gaming unit herein, is employed to provide one or more entries into a bonus event shared among a number of gaming entities. The entries may be associated with a gaming entity identified as a particular gaming machine, or with an individual player, regardless of the identity of the gaming machine on which play is conducted. Thus, the frequency of occurrence of the predetermined activity may be used to increase the number of entries to the bonus event for a specific entity, weighting the odds in favor of a gaming machine or player.

Embodiments of the present invention also comprise gaming systems including networked gaming machines, gaming devices or gaming units each configured for randomly generating and displaying a combination of symbols and for weighting odds in shared bonus events. The gaming system also may include a bonus event computer or controller for conducting a shared bonus event. Participation by a player at one of the gaming machines in a shared bonus event is enabled responsive to occurrence of an activity associated with play of the base or primary game on the gaming machine. A number of occurrences of the activity at the same gaming machine or by the same player and thus identifiable to a single entity, the parameters for entity identification depending upon game architecture, may be employed as multiple entries for a single bonus event, weighting the odds of winning.

The shared bonus event may be configured as a raffle or lottery or may be configured as another game of chance.

In some exemplary embodiments of the present invention, the displayed symbols of a primary or base game offered on the gaming units may be in the form of reels, symbols of reels, playing cards, symbols of playing cards, dice, symbols of dice, numbers, symbols of numbers, and combinations thereof.

In other exemplary embodiments of the present invention, the first gaming units may comprise lottery terminals linked to a central server for conducting a primary raffle or lottery and the shared bonus event may comprise a secondary raffle or lottery, wherein the shared bonus event raffle or lottery is weighted in a manner differently than the weighting used for the primary raffle or lottery.

As used herein, the term "game of chance" includes and encompasses not only games having a random or arbitrary outcome, but also such games which also invite or require some player input to the game having at least a potential for affecting a game outcome. Such player input is generally termed "skill" whether or not such input is in actuality beneficial in terms of game outcome.

BRIEF DESCRIPTION OF THE SEVERAL VIEWS OF THE DRAWINGS

The nature of the present invention as well as other embodiments of the present invention may be more clearly understood by reference to the following detailed description, to the appended claims, and to the several drawings herein, wherein:

DETAILED DESCRIPTION

The following describes some possible embodiments of this invention. It will be appreciated that the examples used herein are illustrative only and do not limit the invention, which is directed to include methods, systems and devices for gaming where the odds of winning a shared bonus event may be weighted among a number of gaming entities.

Figure 1:
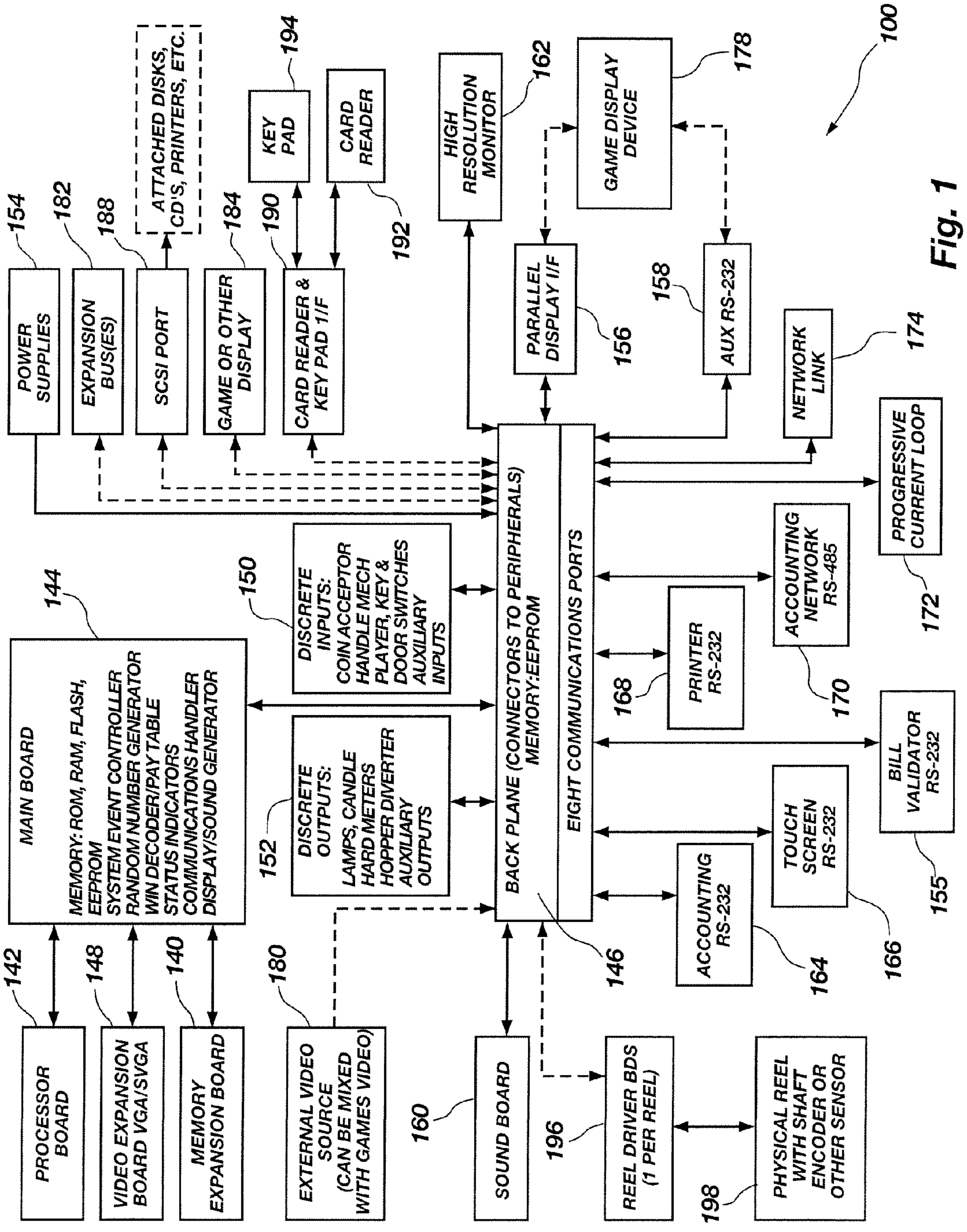
FIG. 1 is a schematic representation of one possible embodiment of a gaming machine that may be used in accordance with the principles of the present invention.

In use and operation, and referring to FIG. 1, the gaming machine, device or unit 100 may include a main board 144 and a back plane 146 integrally or separately formed. Memory expansion board 140 as well as processor board 142 including a graphics system processor and video expansion board VGA/SVGA 148 are operably coupled to the main board 144. The main board 144 preferably includes memory in the form of ROM, RAM, flash memory and EEPROM (electrically erasable programmable read only memory). In addition, the main board 144 includes a system event controller, a random number generator, a win decoder/pay table, status indicators, a communications handler and a display/sound generator.

The main board 144 is operably coupled to the back plane 146 which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements which provide discrete inputs 150 are coin acceptors, game buttons, mechanical hand levers, key and door switches and other auxiliary inputs. Furthermore, the back plane 146 provides the coupling between discrete outputs 152 and the processor and main board 144. Typically, elements that provide discrete outputs 152 are in the form of lamps, hard meters, hoppers, diverters and other auxiliary outputs.

The back plane 146 also provides connectors for at least one power supply 154 for supplying power for the processor board 142 and a parallel display interface (PDI) 156 and a serial interface 158 for coupling to at least one game display device 178. In addition, the back plane 146 also provides connectors for a soundboard 160 and a high-resolution monitor 162. Furthermore, the back plane 146 includes communication ports for operably coupling and communicating with an accounting network 164, a touch screen 166 (which may also serve as a game display device), a bill validator 155 incorporated in a currency (bill) acceptor, a printer 168, an accounting network 170, a progressive current loop 172 and a network link 174.

The back plane 146 optionally includes connectors for external video sources 180, expansion buses 182, game or other displays 184, a SCSI port 188 and an interface 190 for at least one card reader 192 (debit/credit, player card, etc.) and key pad 194. The back plane 146 also preferably includes means for coupling a plurality of reel driver boards 196 (one per reel) which drive physical game reels 198 with a shaft encoder or other sensor means to the processor 142 and main board 144. Of course, the reels may be similarly implemented electronically by display as video images, technology for such an approach being well-known and widely employed in the art. In such an instance reel driver boards 196 and physical game reels 198 with associated hardware are eliminated and the game outcome generated by the random number generator on main board 144 is directly displayed on a video game display 184 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a bonus game as known in the art, in that at least a separate board with a second random number generator may be employed, with associated peripherals and links thereto, for play of the bonus game. In the conventional situation wherein the bonus game may be operably coupled as a "top box" or otherwise associated with a conventional, existing gaming machine configured for play of a base game, many of the components illustrated in FIG. 1 and described with respect thereto will be duplicated, including separate software and associated memory for conducting play of the bonus game with associated pay tables for the bonus awards. The bonus game may comprise a stand-alone bonus game or a progressive bonus game wherein the gaming device 100 is networked to a plurality of other gaming devices, all of which contribute a percentage of wagers on a primary or base game to an award pool to be distributed for a win in the bonus game under appropriate game parameters.

Figure 2:
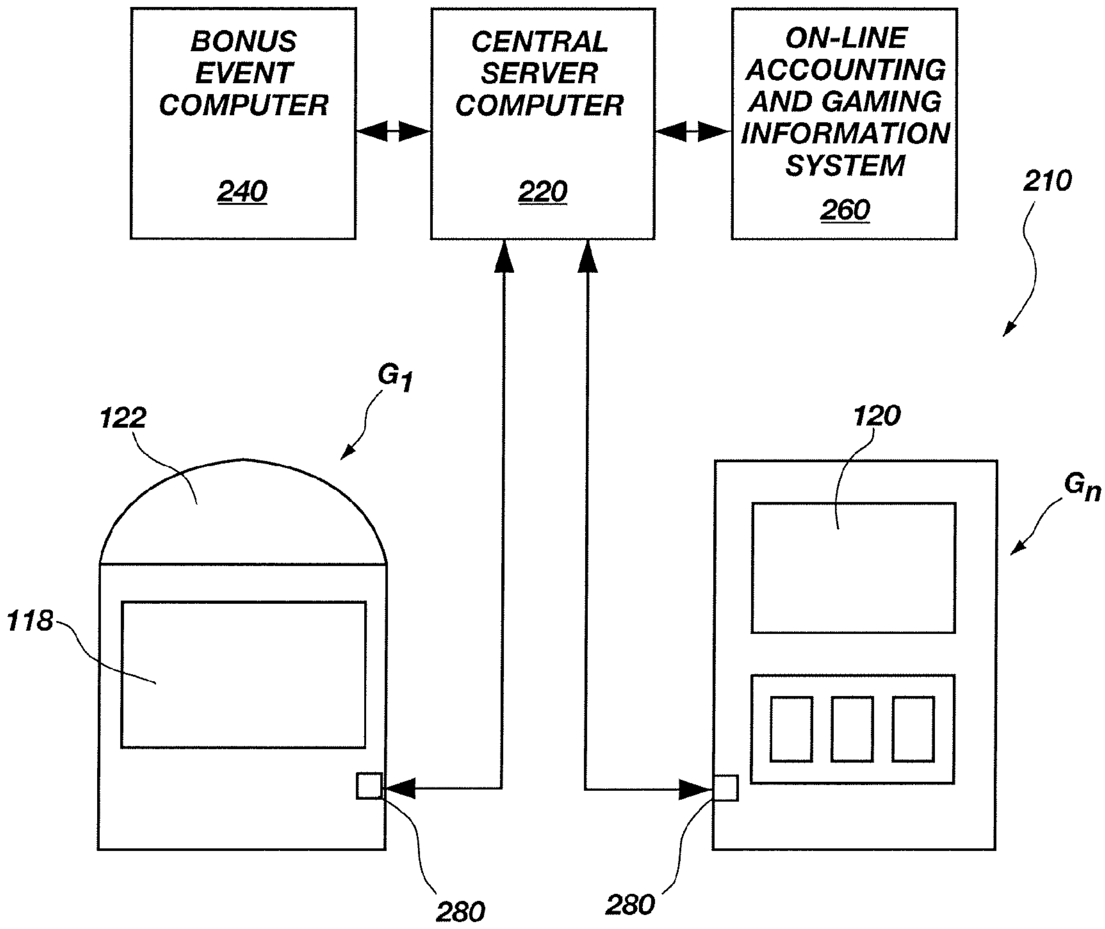
FIG. 2 is a representation of a bonus event gaming system that may be utilized in some possible embodiments of the present invention.

In implementation of the present invention, the gaming machines offering play of the shared bonus event of the present invention and configured, for example, as depicted and described with respect to FIG. 1, may be deployed, as schematically depicted in FIG. 2, in a gaming network 210 including a central server computer 220 operably coupled to a plurality of gaming machines $G_1, G_2 \ldots G_n$ which may include both movable physical symbol or element display and video display machines. It is notable that, unless the gaming network 210 is configured for the traditional style progressive play, utilizing reel machines or otherwise requiring that all gaming machines offer the same base or primary game, a variety of different makes of gaming machines $G_1, G_2 \ldots G_n$ offering widely different games may be incorporated in gaming network 210, since the shared bonus event operates independently of the primary game on each gaming machine. The central server computer 220 automatically interacts with a plurality of gaming machines $G_1, G_2 \ldots G_n$ to activate an incoming call or outgoing call bonus event.

More specifically, and again referring to FIGS. 1 and 2, the gaming network 210 may include a central server computer 220, a bonus event computer 240 and a plurality of gaming machines $G_1, G_2 \ldots G_n$. Each gaming machine $G_1, G_2 \ldots G_n$ includes a controller assembly 280 operably coupled to the central server computer 220 and is comprised of a controller unit designed to facilitate transmission of signals from the individual gaming machine $G_1, G_2 \ldots G_n$ associated with controller assembly 280 to central server computer 220 for monitoring. In addition, the controller assembly 280 includes a network interface board fitted with appropriate electronics for each specific make and model of each individual gaming machine $G_1, G_2 \ldots G_n$. Referring to FIG. 2, in electronic gaming machines using video displays, the central server computer 220 is operably coupled to at least one video game display element 118 as shown at the left hand side of FIG. 2 and sequesters a portion of the video game display element 118 for displaying video attract sequences to attract potential players. Video game display element 118 may be used for display of both the primary and bonus games. Where the gaming network 210 includes reel type game machines $G_1, G_2 \ldots G_n$, as shown at the right hand side of FIG. 2, the central server computer 220 may be operably coupled to at least one active display element 120 so that potential players receive a clear indication of attract sequences and the active display element may be used as a video display for the bonus game. As shown at the left hand side of FIG. 2, the gaming machines $G_1, G_2 \ldots G_n$ may also be provided with a second video display element 122 as an alternative to sequestering a portion of the video game display element 118 for displaying video attract sequences and the bonus game. In addition, the central server computer 220 may include sound generating hardware and software for producing attractive sounds orchestrated with the video attract sequences at each of gaming machines $G_1, G_2 \ldots G_n$ if such is not already incorporated therein. The games support input and output between the player and the gaming machines for such devices as a heads up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1$, $G_2$ . . . $G_n$ to display full-motion video animation with sound to attract players to the machines. During idle periods, the gaming machines $G_1$, $G_2$ . . . $G_n$ preferably display a sequence of attraction messages in sight and sound. The videos may also be used to market specific areas of the casino and may be customized to any informational needs.

Furthermore, the gaming network 210 may include bonus event computer 240 operably coupled to the central server 220 for scheduling bonus parameters such as the type of bonus game, pay tables and players. It is contemplated that the functions of central server computer 220 and bonus event computer 240 may be combined in a single computer. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

Figure 3:
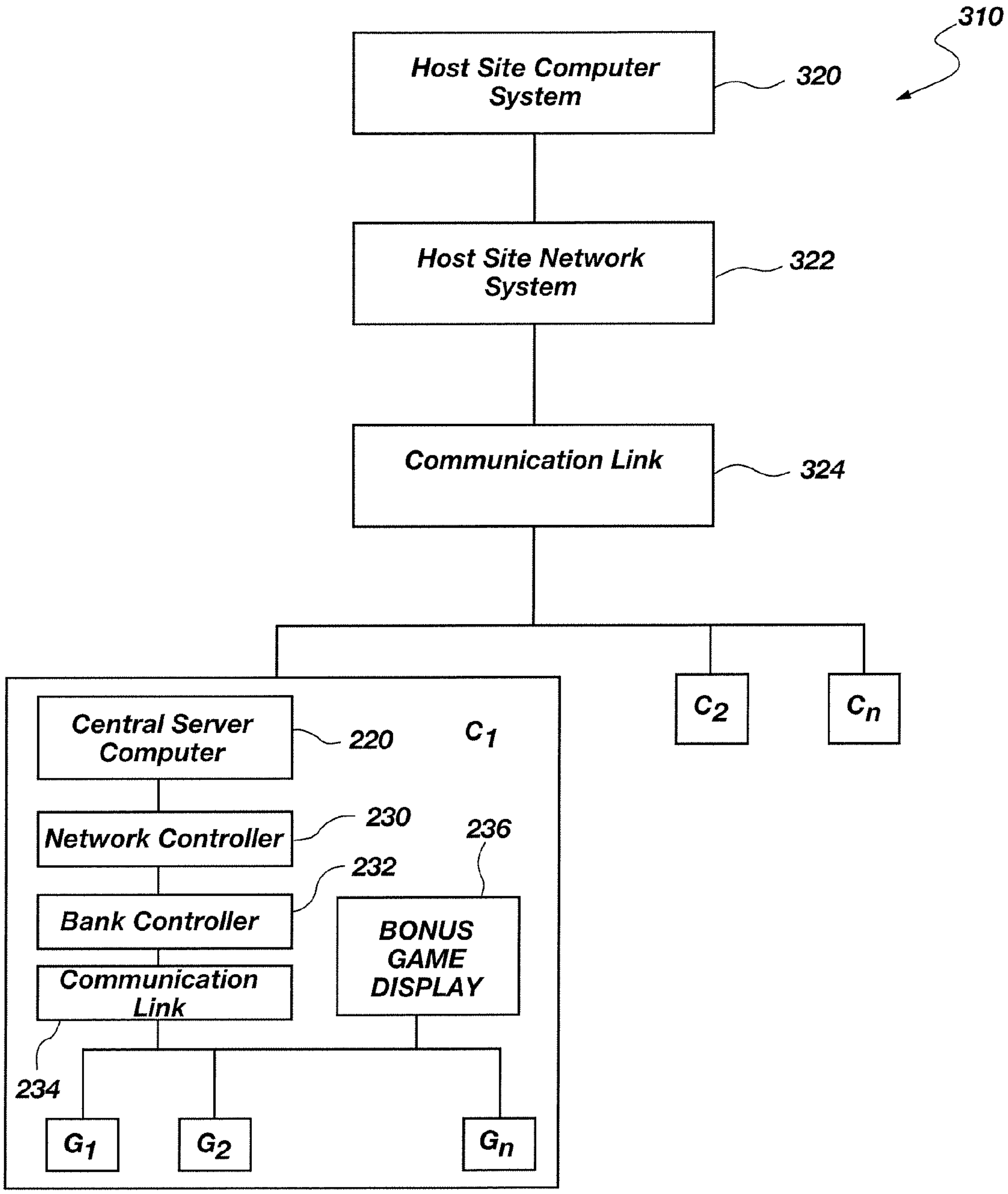
FIG. 3 is a representation of a multi-site ongoing bonus gaming system that may be utilized in some embodiments of the present invention.

As previously implied, a bank of gaming machines $G_1$, $G_2$ . . . $G_n$ may be networked together in a progressive configuration, as known in the art, wherein a portion of each wager to initiate a primary game may be allocated to bonus event awards such as a shared bonus event configured in accordance with the present invention. In addition, and referring to FIG. 3, a host site computer 320 is coupled to a plurality of the central server computers 220 at a variety of remote gaming sites $C_1$, $C_2$ . . . $C_n$ (which may comprise, but are not limited to, casino sites) for providing a multi-site linked automated bonus gaming system 310.

Preferably, the host site computer 320 will be maintained for the overall operation and control of the system 310. The host site computer 320 includes a computer network 322 and a communication link 324 provided with a high-speed, secure modem link for each individual casino site $C_1$, $C_2$ . . . $C_n$.

Each casino site $C_1$, $C_2$ . . . $C_n$ includes the central server computer 220 provided with a network controller 230 which includes a high-speed modem operably coupled thereto. Bi-directional communication between the host site computer 320 and each casino site central server 220 is accomplished by the set of modems transferring data over communication link 324.

A network controller 230, a bank controller 232 and a communication link 234 are interposed between each central server 220 and the plurality of attached gaming machines at each casino site $C_1$, $C_2$ . . . $C_n$. In addition, the network controller 230, the bank controller 232 and the communication link 234 may optionally be interposed between each central server computer 220 and at least one separate display 236 at each casino site $C_1$, $C_2$ . . . $C_n$. However, the automated bonus gaming system 310 may include hardware and software to loop back data for in-machine meter displays to communicate with bonus event award insert areas on gaming machines $G_1$, $G_2$ . . . $G_n$.

Figure 4:
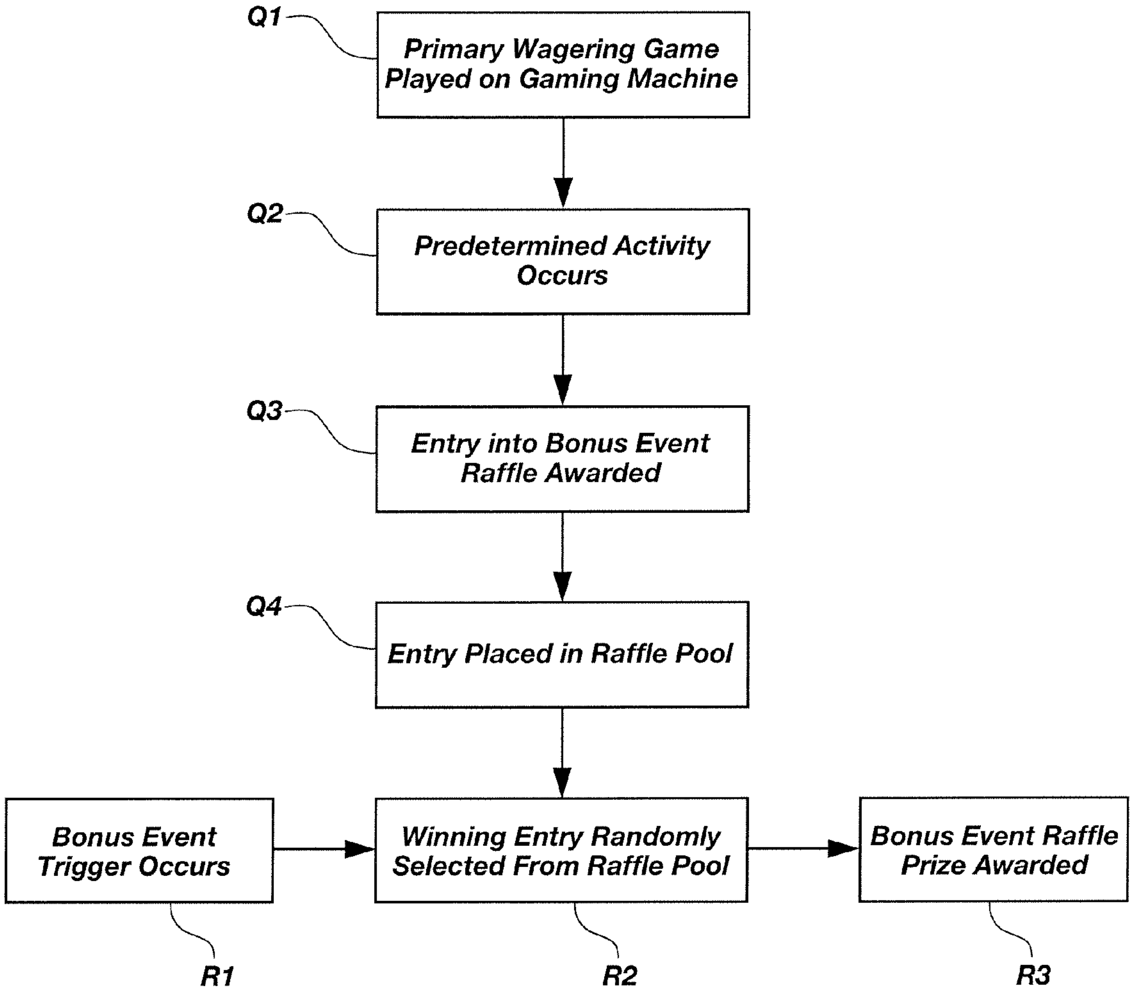
FIG. 4 is a flowchart of one embodiment of a process for weighting odds between gaming devices in a shared bonus event in accordance with the principles of the present invention.

Turning to FIG. 4, one possible embodiment of a method for weighting odds among gaming machines in a shared bonus event and particularly applicable, without limitation, to using a raffle or lottery approach to bonus gaming, will be discussed with reference to the present invention. In order to better understand and appreciate the invention, this method will be discussed in the context of several exemplary implementations in connection with reference to FIGS. 1, 2 and 3. It will be appreciated that these examples are illustrative only and that no limitation of the invention is contained therein. It will be further appreciated that the principles and methods of the present invention may be practiced with alternative embodiments of gaming machines $G_1$, $G_2$ . . . $G_n$ and gaming machine network systems 210 or 310 as known now, or in the future, to those skilled in the art and all such embodiments and methods are within the scope of the present invention.

As shown in box Q1 of FIG. 4, a primary or base game is played on a gaming machine $G_1$, $G_2$ . . . $G_n$. The base game may be any game that can be played on an individual gaming machine, as described above. The base, or primary, game on each of gaming machines $G_1$, $G_2$ . . . $G_n$ may be, for example, a multi-line, five-reel spinning reel game, either electromechanical with actual moving reels or electronic with simulated reels and movement thereof, the game awarding prizes when specified numbers, types and combinations of symbols occur on a winning pay line or are otherwise visibly displayed in a winning pattern or location. Alternatively, the primary game may comprise any other reel-type game, card game, bingo game, Keno game, or other game of chance susceptible to representation in an electronic or electromechanical form. Typically, a player makes a wager on a gaming machine $G_1$, $G_2$ . . . $G_n$, as by inserting a coin in a coin acceptor forming a discrete input 150, a bill into a bill validator 155, a credit or debit card into a card reader 192, or otherwise. The player then activates the base or primary game, resulting in the random generation and display of a combination of symbols. It is preferred that different combinations of symbols be used to determine whether the player is awarded a prize in the base or primary game, as well as the amount of any prize awarded.

As shown in box Q2, as a game of chance on gaming machine $G_1$, $G_2$ . . . $G_n$ is played, a predetermined activity that has been selected as a qualifying event in association with play of the base or primary game will occasionally occur on that machine $G_n$. This predetermined activity may be one of a number of possible predetermined activities associated with play on a gaming machine $G_n$ and comprise either a randomly or non-randomly occurring activity. In this exemplary embodiment, it is currently preferred that the activity comprise a randomly occurring activity. For example, where the gaming machine $G_n$ is a spinning reel machine, the random occurrence of a certain number of one or more symbols on one or more pay lines on a spin of the reels may be a qualifying event, as may be certain preselected combinations of symbols. With multiple pay line reel machines, these may be required to occur at a specific pay line or at any pay line. Alternatively, the placement of a wager of a certain amount on a gaming machine $G_n$, the placement of a selected number of wagers, the elapsed time spent playing a gaming machine $G_n$ or a combination of elapsed time of play with number of wagers and/or amount wagered may be used as the predetermined activity. For other types of gaming machines $G_n$, the predetermined activity may be any activity that can occur on that machine, but it is currently preferred that the predetermined activity be a randomly determined outcome of a base or primary game. It will be appreciated that the predetermined activity may be selected to randomly occur at any desired percentage of outcomes of a base or primary wagering game.

As shown in box Q3, when the predetermined activity occurs on a gaming machine $G_n$, a qualification to participate in a shared bonus event in the form of a raffle or lottery, or one or more "entries" to the shared bonus event raffle or lottery is awarded. As shown in box Q4, the entry or entries is placed into a raffle pool for participation in the shared bonus event raffle. This sequence of events may happen, in a number of different ways, each of which is within the scope of the present invention. Of course, as shown by the arrow extending back from box Q4 to box Q1, the primary or base game may continue to be played to accrue additional entries to the shared bonus event raffle if the bonus event raffle or lottery has not yet taken place.

For example, in a first exemplary embodiment of the sequence, a number of gaming machines $G_1, G_2 \ldots G_n$ are operatively linked to and in communication with a bonus event computer 240 for conducting a shared bonus event configured as a raffle or lottery. The bonus event computer 240 includes a raffle pool controller (alternatively a separate raffle pool controller may be provided), which stores raffle pool data in a memory of the bonus event computer 240. As each of the gaming machines $G_1, G_2 \ldots G_n$ is played, the results of each game are conveyed to the raffle pool controller. The results contain information about the amount of the bet placed, the occurrence of the predetermined activity and an identification of each game machine $G_1, G_2 \ldots G_n$ which, in this embodiment, may be employed as identified gaming entities. For each designated wagering unit (such as a coin denomination, a minimum wager denomination, or multiple of such) wagered on a base or primary game which may result in the predetermined activity, an entry is awarded and stored in the raffle pool, until a bonus event raffle occurs. Alternatively, each gaming machine $G_n$ may retain the entry or entries in a memory thereof, and the raffle pool controller may poll gaming machines $G_1, G_2 \ldots G_n$ when a shared bonus event is triggered and retrieve and assemble those entries associated with each given gaming machine $G_1, G_2 \ldots G_n$ into a raffle pool when executing a shared bonus event raffle.

In another exemplary embodiment, entries to participate in the bonus event raffle may be awarded proportionately to the number of wagers made by a player or to the value of each wager made in association with a specific gaming entity such as a given gaming machine $G_1, G_2 \ldots G_n$ or a specific player. This allows for the gaming machine's or player's amount of play over a given time period (termed "rate of play") or accumulation of play to directly influence the odds of obtaining a bonus prize. Where the gaming network 210 includes a player tracking module in the accounting and gaming information system 260, or another player tracking system as known to those of ordinary skill in the art, players can be uniquely identified. This may be readily accomplished by using so-called "player cards" or "player tracking cards" issued by a casino or group of related casinos that are inserted into a card reader 192, so-called "smart cards" associated with a given player, unique codes that may be input by players into a key pad 194, or through any other similar technique known in the art. When a uniquely identified player places a wager at a gaming machine $G_1, G_2 \ldots G_n$ that results in the occurrence of a predetermined activity, the resulting qualification for participation in the shared bonus event is associated with that player. One method of doing this is to prompt entry on a key pad of the gaming machine $G_1, G_2 \ldots G_n$ of a player's tracking number, found on the player's tracking card or elsewhere as the identifier for each entry, or by automatically associating each entry with the player's tracking number by requiring prior insertion of his or her tracking card into a gaming machine $G_1, G_2 \ldots G_n$ as a prerequisite for potential shared bonus event participation.

The qualification may be retained in the raffle pool controller or the memory of the gaming machine $G_n$, as described above. Alternatively, the qualification may be retained elsewhere, as in the player tracking system or stored on a player card and for placement into the raffle pool at the time of a bonus event raffle.

The ability to associate a qualification, or entry, with a specific player adds another level of flexibility to gaming systems in accordance with the present invention. The system may be configured to allow a uniquely identified player stopping play on a gaming machine $G_n$ prior to a bonus event raffle to retain his entries, remove them from the raffle pool and then to reenter those entries into a raffle pool the next time that player initiates a session of play on gaming machine $G_n$. A uniquely identified player may also be able to stop play on a first gaming machine $G_1$ and move to another gaming machine $G_2$ and continue play while retaining the entries obtained at the first machine $G_1$. In embodiments that include a multi-site system, such as that depicted in FIG. 3, a uniquely identified player may even be able to utilize entries obtained at a gaming machine $G_1, G_2 \ldots G_n$ located at a first casino or other remote gaming site $C_1$ during subsequent play on a gaming machine $G_1, G_2 \ldots G_n$ located at a second casino or other remote gaming site $C_2$ participating in a multi-site gaming system 310. This allows the multi-site automated bonus gaming system 310 to be used to encourage players to return to one of a group of related casinos.

When a bonus trigger event occurs, a shared bonus event raffle is initiated as shown in box R1 of FIG. 4. The bonus event trigger may be any event that can be used to initiate a bonus event raffle. Examples of such events include the random occurrence of a preselected event on any gaming machine $G_n$ attached to the gaming network 210, the passage of a fixed interval of time, the playing of a fixed number of games on the gaming machines $G_1, G_2 \ldots G_n$ networked to form the gaming network 210, the placement of a certain wager on any gaming machine $G_n$, a bonus raffle prize reaching a certain value (in the case of a progressive, where a portion of base or primary game wagers are diverted to the bonus prize pool), or any other occurrence that may be used to trigger a bonus event raffle.

Once the bonus event raffle is initiated, a winning entry is selected from the raffle pool as depicted in box R2. This selection is preferably random in nature and may be accomplished in a number of ways. In one possible embodiment, at the time a bonus trigger event occurs, a first gaming machine $G_1$ may have qualified to participate in the bonus raffle 3 times and thus has 3 associated entries, a second gaming machine $G_2$ may have qualified to participate in the bonus raffle 2 times and thus has 2 associated entries, and one of the remaining gaming machines $G_n$ may have qualified to participate 5 times and thus has 5 associated entries. The bonus event controller, such as a software program operating on bonus event computer 240, assigns each qualification or entry a raffle number, for example, gaming machine $G_1$ is assigned raffle numbers 1, 2 and 3; gaming machine $G_2$ is assigned raffle numbers 4 and 5; and gaming machine $G_n$ is assigned raffle numbers 6, 7, 8, 9 and 10. A random number generator, preferably a microprocessor running appropriate software in bonus event computer 240, is used to generate a random number within the total number of assigned raffles. Assuming the random number generator generates the number 4, then that qualification is selected as a winning qualification, and the winning entry is associated with gaming machine $G_2$.

In another exemplary embodiment, a raffle number is assigned to each entry at the time it is entered into the raffle pool. The raffle pool may be entered on bonus event computer 240 as each entry is obtained, or collected from the memory of each gaming machine $G_1$, $G_2$ $G_n$ at the time of the bonus event trigger. In this embodiment, it is preferred that each entry is associated with a uniquely identified player. A raffle number is randomly selected, as by using a microprocessor acting as a random number generator, and a winning raffle entry is selected as associated with the uniquely identified player entity. It will be appreciated that these examples are merely illustrative and that any method of randomly selecting a winning raffle entry may be used and is within the scope of the present invention. By providing that a shared bonus event prize will be awarded in a raffle or lottery fashion by selecting among the entries, the odds of winning the shared bonus event may be directly weighted among the participating gaming machines $G_1$, $G_2$ . . . $G_n$, or players, in response to the qualifying events. This allows the odds of a bonus event raffle to be weighted in accordance, for example, with the play on a gaming machine $G_n$ or the success of a player in a session of participating in a primary game.

It will be further appreciated that although the singular term winning raffle entry is used, it is within the scope of the present invention to select one or more winning raffle entries as desired. For example, it may be desirable to award a grand prize to a first selected raffle entry, and one or more runner-up prizes to additional winning raffle entries. In multi-site embodiments, using gaming systems 310 similar to that shown in FIG. 3, a winning raffle entry may be selected for a system wide prize, with one or more additional site specific winning raffle entries selected at each casino or remote gaming site $C_1$, $C_2$ . . . $C_n$.

Once a winning entry is selected, a shared bonus event raffle prize is awarded to the gaming entity identified as the holder of the winning entry as depicted in box R3. In embodiments where the entries are associated with a uniquely identified player entity, the bonus raffle prize is awarded to that player entity. In embodiments where each entry is associated with a specific gaming machine entity $G_n$, the bonus raffle prize is awarded at that gaming machine $G_n$. It will be appreciated that the bonus raffle prize may consist of any prize desired to attract players to play the gaming machines $G_1$, $G_2$ . . . $G_n$ and that the bonus prize may be awarded in suitable fashion. For example, where a bonus raffle prize is large in size or value, or is a unique object, such as a vehicle or jewelry or the like, the casino personnel may be directed to deliver the prize to the player at that gaming machine $G_n$. Alternatively, the gaming machine $G_n$ may direct a uniquely identified player to collect the bonus raffle prize from the casino staff, at a pay booth, or provide a player with a token or ticket that can be exchanged for the bonus raffle prize. Where the bonus raffle prize is smaller, or consists of credits, the bonus event computer 240 may simply direct a gaming machine $G_n$ to pay out the bonus raffle prize to a player thereat, or to credit the amount to a specifically identified player in the player tracking module of the accounting and gaming information system 260, or to credit the amount on a player tracking card inserted into a card reader 192.

It will be appreciated, as previously noted, that it is within the scope of the present invention for the bonus event raffle prize to include a progressive bonus prize funded by the play occurring on the gaming machines $G_1$, $G_2$ . . . $G_n$. In such embodiments, a percentage of each wager placed on a gaming machine $G_n$ may be contributed to a progressive bonus prize fund, which continues to grow in size until a progressive bonus prize is awarded in a bonus event raffle. Alternatively, a percentage of wagers resulting in a payout at each gaming machine $G_n$, a percentage of other selected wagers placed at each gaming machine $G_n$, or a percentage of payouts from selected winning combinations of symbols at gaming machine $G_n$ may be used to fund the progressive bonus prize. It is preferred that once a progressive bonus prize is awarded, the progressive bonus prize fund returns to a preselected base level from which it then continues to grow.

It will be appreciated that it is within the scope of the present invention to allow a personal computer connected to a network, including the Internet, to function as a gaming machine $G_n$, under appropriate circumstances. For example, where a secure connection may be made to an online casino, over the Internet, and credits may be entered to play a base or primary game using a credit card, or another recognized account, a portion of the personal computer monitor may be sequestered to allow playing of the base or primary game of a gaming machine $G_n$. As with more traditional gaming machine $G_n$ embodiments as described above, a player thereat may qualify to participate in a bonus event raffle upon the occurrence of a predetermined random event.

It will be further appreciated that it is within the scope of the present invention to provide systems that account for a player ending a session of play prior to the occurrence of a bonus event raffle. For example, where system or network 310 or 210 includes a player tracking system, the entries held by a uniquely identified player may continue to be associated with that player. If an entry associated with that player is selected as a winning entry, the player's account in the player tracking system is credited with the value of the bonus event prize. Upon starting a later session of play, the system informs the player of the award of the bonus event prize and where necessary provides instructions on how to collect it. Alternatively, the player tracking may search all the gaming machines $G_1$, $G_2$ . . . $G_n$ in the network 210, or all gaming machines at one or more casinos or other linked remote gaming sites $C_1$, $C_2$ . . . $C_n$ for the uniquely identified player. A search of all gaming machines at the one or more casinos or other remote gaming sites $C_1$, $C_2$ . . . $C_n$ may even include searching at gaming machines not participating in the shared bonus event raffle. If the uniquely identified player is not located within the network 210, or at a particular casino $C_n$, (or group of related casino properties) an alternate winning entry may then be selected (or a selection of alternate winning entries may be selected with the initial selection and utilized only when the uniquely identified player cannot be located). Desirably, such embodiments may require a player to remain at a particular casino $C_n$ (or at least at related casino properties $C_1$, $C_2$ . . . $C_n$) and continue gaming to receive a bonus prize, while allowing a player to switch to a different type of gaming machine, should the player grow tired of a primary game on a particular gaming machine $G_1$, $G_2$ . . . $G_n$.

Yet another alternative embodiment allows for limited bonus event raffles. Such embodiments allow a holder of entries to utilize all entries held by that entity before terminating play on a gaming machine $G_n$. In such an embodiment, the bonus trigger event may consist of a request by a player to initiate a bonus event raffle. A winning raffle entry is selected, as described above, out of all entries available to the raffle pool. If the holder of the winning raffle entry is the requesting player (or the gaming machine $G_n$ where the request was submitted), the bonus raffle prize is awarded to that player. If the winning raffle entry is not associated with that player (or gaming machine $G_n$), then the bonus raffle prize is not awarded. Instead all of the requester's entries are canceled from the raffle pool. In embodiments where the raffle bonus prize is a progressive bonus prize, as described above or similar thereto, this allows each player to utilize entries before ending play at a gaming machine, while allowing the progressive bonus to continue to grow where that player is not selected. Of course, it will be appreciated that a player may leave a gaming machine without utilizing or retaining the qualifications to participate, allowing the next player at that machine to utilize those entries. It may be desirable to have the gaming machines set to cancel retained qualifications after a set period of time, such as ten minutes.

There are contemplated numerous and diverse ways of designating what may be termed a predetermined activity associated with play of a base or primary game to qualify a player for entry into the shared bonus event. The following are nonlimiting examples of such activities, the first group of examples being termed "proportionate" determination of entries according to play of the primary or base game, while the second group may be termed "priority" determination of entries according to play of the primary or base game.

In a first proportionate example, on a single pay line, multiple coin bet per pay line gaming machine, each specific bet or selected outcome, or combination thereof, would generate a single entry into the shared bonus event. In a second proportionate example, on multiple pay lines of a single coin bet per pay line gaming machine, each specific bet or selected outcome, or combination thereof, would generate a single entry into the shared bonus event. In a third proportionate example, on multiple pay lines of a multiple coin bet per line gaming machine, each specific bet or selected outcome, or combination thereof, would generate one entry per coin bet per pay line into the shared bonus event. In a fourth proportionate example, the number of entries may be caused to vary, for example, if a given selected outcome is achieved in combination with a certain bet or combination of bets or pay line or combination of pay lines, or entries randomly issued among a group of networked gaming machines during certain slow play periods or according to other parameters of the game architecture. In a fifth proportionate example, entries are not issued until immediately prior to the time of a shared bonus event. At that time, the bonus event computer is used to poll all of the networked gaming machines and assign entries to the shared bonus event in proportion to coin in, number of base or primary games played, or other parameter employed to reward play subsequent to the last preceding shared bonus event, selected period of time, etc.

In a first priority example, on a single pay line, multiple coin bet per pay line gaming machine, a single coin bet or selected outcome, or combination thereof, would generate an entry to the shared bonus event, while larger bet amounts, specific outcomes from those larger bet amounts or a combination thereof would generate more than a proportionate number of shared bonus event entries, thus providing a higher payback percentage in return for a larger volume of coin in. In a second priority example, on a multiple pay line, single coin bet per pay line gaming machine, a single coin bet or selected outcome, or combination thereof, would generate an entry to the shared bonus event, while larger bet amounts (covering additional pay lines), different specific outcomes from those larger bets or a combination thereof would generate more than a proportionate number of shared bonus event entries, thus providing a higher payback percentage in return for a larger volume of coin in. In a third priority example, each bet at a specific threshold amount would generate a specific number of entries. Specific, selected outcomes to achieve a higher level of priority and thus more entries would be reserved for larger bets. For example, the odds weighting may be configured so that each time all pay lines of a gaming machine are covered, a disproportionately larger number of entries is generated in response to one or more selected game outcomes. If a variable number of coins may be bet on various pay lines, selected specific outcomes on a pay line in combination with a minimum bet would generate a given number of entries and selected specific outcomes on a pay line in combination with bets over the minimum would generate a disproportionately higher number of entries.

It will be appreciated that additions and modifications to, and deletions from, the above exemplary implementations of the present invention, or alternative ongoing bonus games or events using the odds weighting approach encompassed thereby, may be created readily by those of ordinary skill in the art. All such modifications and alternative games and the systems and methods of using same fall within the scope of the present invention. It will be further appreciated that any method, system or device for conducting or playing an ongoing bonus game wherein odds weighting in accordance with the foregoing description is employed may fall within the scope of the present invention.

Accordingly, the present invention includes methods of providing a weighted odds bonus event raffle over linked gaming machines $G_1, G_2 \ldots G_n$. One illustrative embodiment of such a method may be practiced by providing a bonus event computer that is configured for operating a bonus event raffle, attaching a number of gaming machines $G_1, G_2 \ldots G_n$ in operative communication with the bonus event computer, each of the gaming machines $G_1, G_2 \ldots G_n$ set up to generate a series of random outcomes and to provide an entry into the bonus event raffle upon an occurrence of a predetermined activity, providing an entry into the bonus event raffle upon an occurrence of that predetermined activity, tracking the entry in a set of entries including storing the identity of a holder of the entry, randomly selecting one or more winning raffle entries from the set of entries in response to a bonus event trigger, and awarding a bonus prize to the holder of each winning raffle entry.

It is currently preferred that the bonus event computer be used to track the entries and to randomly select the winning raffle entry. The holder of the entry may be an entity in the form of the gaming machine $G_n$ providing the entry or a player at a gaming machine $G_n$, who may be uniquely identified. The bonus prize may be awarded directly to the player, or by the gaming machine $G_n$. Uniquely identified players may be able to retain and use entries at later times, or on other gaming machines $G_1, G_2 \ldots G_n$, as previously discussed. The bonus event trigger may be any suitable event, as previously discussed, including a player request for a limited bonus event raffle. It is preferred that the entries be provided in response to a random occurrence on a gaming machine $G_n$, although alternatives as previously discussed may also be used. It may be preferred that each gaming machine $G_n$ continue to provide entries until a bonus event trigger occurs, allowing the bonus event odds to be weighted based upon play in the primary game on all networked or otherwise associated gaming machines. The bonus prize may be a progressive bonus funded by a percentage of selected wagers placed upon said number of gaming machines $G_1, G_2 \ldots G_n$.

The present invention further includes methods of playing a game of chance. One possible embodiment of such a method may be practiced by placing a wager with a gaming machine $G_n$ configured to generate a series of random outcomes, qualifying for participation in a randomly determined bonus raffle by obtaining an entry upon an occurrence of a specific predetermined activity associated with play on the gaming machine $G_n$, and participating in the randomly determined bonus raffle upon the occurrence of a bonus raffle trigger event. It is preferred that additional entries to the randomly determined bonus raffle be obtained on subsequent occurrences of the predetermined activity, which may be a specific random outcome of a primary game, or any other suitable event as previously discussed.

It is preferred that this embodiment of a method further include the act of receiving a bonus raffle prize in the randomly determined bonus raffle, upon the selection of the entry. The bonus raffle may be operated on a bonus event controller, such as a bonus event computer, in communication with the gaming machine $G_n$. Where the game is played upon a gaming system including a player tracking system, the player may be uniquely identified and able to retain entries for later use or move between gaming machines $G_1, G_2 \ldots G_n$, as previously discussed. The bonus trigger may comprise any suitable event, as previously discussed, including a request resulting in a limited bonus event raffle. The bonus raffle prize received may be any suitable prize, including a progressive bonus prize.

It is also contemplated that a holder of shared bonus event entries may be offered the opportunity to cash in such entries for some monetary or other award of value rather than letting them ride until the next shared bonus event.

It will be appreciated that a shared bonus event using entry weighting in accordance with the present invention may be offered by a casino property or group of related properties to all players of a particular type or class of game, such as reel-type gaming machines, video poker, video blackjack, video bingo, video Keno, or other game wherein predetermined activities for entering the shared bonus event may occur and be tracked. A subclass of gaming machines such as, for example, the popular WHEEL OF FORTUNE® gaming machines, may be networked for shared bonus event play.

It will also be appreciated that a shared bonus event using entry weighting in accordance with the present invention may be conducted in association with play of a primary or base game of chance configured as a governmental raffle or lottery, wherein weighting of the shared bonus event as a secondary raffle or lottery is different than weighting of the primary or base game. In such an example, the gaming machines $G_1$, $G_2 \ldots G_n$ depicted in FIG. 2 comprise lottery terminals for sale of lottery tickets at, for example, retail locations under control of central server computer 220 and bonus event computer 240 is configured to administer the secondary raffle or lottery and raffle pool associated therewith. For example, a predetermined activity qualifying lottery entrants for entry into the shared bonus event may be a first purchase of any denomination primary lottery ticket on a given day in association with a unique player identifier. Thus, primary lottery participants may be incentivized to return frequently over time to retail locations to purchase primary or base game lottery tickets. Another exemplary approach to weighting is to provide a shared bonus event in the form of a secondary raffle or lottery to those purchasers of a minimum or maximum wager primary lottery ticket, thus appealing to different demographics for lottery play. Another approach would be to configure a shared bonus event secondary lottery limiting entrants to those purchasing primary lottery tickets in the 24 or 48 hours (or other suitable limited time) immediately following a payout from the primary lottery, typically a slow primary lottery ticket sales period, or to restrict the shared bonus event to all those who purchased primary lottery tickets before a cutoff time in advance of a scheduled primary lottery drawing to reward faithful participants rather than those who only buy on the last day before a drawing or when a large prize has accumulated. Similarly, when a new primary lottery pool is growing, purchasers of tickets before the pool reaches a given magnitude, such as $50 million, may be automatically entered in a secondary lottery.

Although the present invention has been shown and described with respect to exemplary embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A gaming method comprising:

(a) causing a processor to operate with at least one display device and at least one input device to:

(i) receive a wager from a player to play a primary game;

(ii) display an image associated with the primary game;

(iii) determine an outcome of the primary game;

(iv) determine if one qualifying activity associated with the primary game has occurred;

(v) determine if at least one qualifying activity modifier event has occurred;

(vi) for each occurrence of the at least one qualifying activity modifier event that occurs after an occurrence of said qualifying activity, associate at least one entry for a shared bonus event with a gaming entity;

(vii) for each associated entry:

(A) determine to place said associated entry with one of: a set of entries for a first shared bonus event and a set of entries for a second shared bonus event; and (B) place said associated entry with the determined one of: the set of entries for the first shared bonus event and the set of entries for the second shared bonus event;

(viii) upon a determination that the player has left a gaming system, after a set period of time elapses from the determination that the player has left the gaming system and prior to a selection of any winning entries from either the set of entries for the first shared bonus event or the set of entries for the second shared bonus event, cancel the at least one associated entry from the set of entries for the first shared bonus event or the set of entries for the second shared bonus event;

(ix) select the winning entry from the set of entries for the first shared bonus event; and (x) select the winning entry from the set of entries for the second shared bonus event.

2. The gaming method according to claim 1, wherein the at least one qualifying activity modifier event is a wager amount.

3. The gaming method according to claim 1, wherein the at least one qualifying activity modifier event is a predetermined combination of symbols.

4. The gaming method according to claim 1, wherein the primary game is slots, and the at least one qualifying activity modifier event is a predetermined combination of symbols along a payline.

5. The gaming method according to claim 1, wherein the qualifying activity comprises a randomly occurring activity.

6. The gaming method according to claim 5, wherein the qualifying activity comprises one or more symbols on one or more paylines.

7. The gaming method according to claim 1, wherein the qualifying activity comprises a wager of a certain amount, a selected number of wagers, an elapsed time spent playing a gaming machine, or combinations thereof.

8. The gaming method according to claim 1, which includes causing the processor to determine if a first trigger event has occurred; select a winning entry from the set of entries for the first shared bonus event if the first trigger event has occurred; determine if a second trigger event has occurred; and select a winning entry from the set of entries for the second shared bonus event if the second trigger event has occurred.

9. The gaming method according to claim 8, wherein the first or second trigger event comprises a random occurrence, a fixed time interval, a fixed number of primary games, a certain wager, or a shared bonus event award value.

10. The gaming method according to claim 8, wherein the first or second trigger event occurs at one of a plurality of networked gaming machines, each of the networked gaming machines comprising a gaming entity.

11. The gaming method according to claim 1, wherein the primary game is one of slots, poker, blackjack, bingo, keno, raffle or lottery.

12. The gaming method according to claim 1, comprising: providing an award according to the outcome of the primary game; providing an award to the gaming entity associated with the winning entry of the first shared bonus event; and providing an award to the gaming entity associated with the winning entry of the second shared bonus event.

13. The gaming method according to claim 1, which includes causing the processor to operate with the at least one display device and the at least one input device to: receive a first input from the player to receive a monetary or other award in exchange for the plurality of entries instead of placing the plurality of entries with one of: the set of entries for the first shared bonus event and the set of entries for the second shared bonus event; and provide the monetary or other award to the player.

14. The gaming method of claim 1, which includes causing the processor to associate a plurality of entries for the shared bonus event with the gaming entity if the one qualifying activity associated with the primary game has occurred and the at least one qualifying activity modifier event has occurred.

15. The gaming method of claim 14, which includes causing the processor to place the plurality of entries with one of: the set of entries for the first shared bonus event and the set of entries for the second shared bonus event.

16. The gaming method of claim 1, which includes causing the processor to receive a first input from the player to place the at least one entry with one of: the set of entries for the first shared bonus event and the set of entries for the second shared bonus event.

17. The gaming method of claim 1, which is provided via a data network.

18. The gaming method of claim 17, wherein the data network is an internet.

19. A gaming system comprising:

a plurality of gaming apparatuses located at a plurality of different remote locations, each gaming apparatus including: a display device, an input device, a gaming apparatus processor and a memory device which stores a plurality of instructions, which when executed by the gaming apparatus processor, cause the gaming apparatus processor to operate with the display device and the input device to:

(a) enable a player to place a wager on a play of a primary wagering game, and (b) display the play of the primary wagering game; and a central server configured to communicate with each of the gaming apparatuses, said central server programmed to:

(a) identify at least one player playing at one of the gaming apparatuses;

(b) for each identified player that placed at least one wager on the play of the primary wagering game of at least one of the gaming apparatuses:

(i) determine if a qualifying activity has occurred in association with said played primary wagering game, and (ii) if the qualifying activity has occurred, associate a quantity of entries for a shared bonus event with the identified player;

(c) for each of a plurality of entries:

(i) distinct from any placement of any wager, enable the identified player to place said entry associated with the identified player in one of: a first set of entries for a first shared bonus event and a second set of entries for a second shared bonus event, wherein the first set of entries for the first shared bonus event are maintained at a first one of the remote locations, the second set of entries for the second shared bonus event are maintained at a second, different one of the remote locations and the player is enabled to place each entry in either set of entries independent of the location of the gaming apparatus in which the player was associated with the entry, and (ii) upon a determination that the identified player has left at least one of the gaming apparatuses, after a set period of time elapses from the determination that said identified player has left at least one of the gaming apparatuses and prior to a selection of any winning entries from either the set of entries for the first shared bonus event or the set of entries for the second shared bonus event, cancel said entry associated with the identified player;

(d) select the winning entry from the first set of entries for the first shared bonus event; and (e) select the winning entry from the second set of entries for the second shared bonus event.

20. The gaming system of claim 19, wherein if the qualifying activity has occurred, said central server is programmed to modify the quantity of entries associated with the identified player for the shared bonus event.

21. The gaming system of claim 20, wherein the quantity of entries is modified based on at least one selected from the group consisting of: the wager placed on the play of the primary wagering game and an outcome generated for the play of the primary wagering game.

22. The gaming system of claim 19, wherein the qualifying activity is at least one selected from the group consisting of: a randomly occurring activity, a designated outcome generated for the play of the primary wagering game, a designated amount placed on the play of the primary wagering game, and a designated amount of time playing the primary wagering game of at least one of the gaming apparatuses.

23. The gaming system of claim 19, wherein said central server is programmed to select at least one of the winning entries based on at least one selected from the group consisting of: a random occurrence, a fixed time interval, a fixed number of primary games played, a designated wager amount placed on the play of the primary wagering game, and a shared bonus event award value.

24. A gaming system comprising:

a plurality of gaming apparatuses located at a plurality of different remote locations, each gaming apparatus including: a display device, an input device, a gaming apparatus processor and a memory device which stores a plurality of instructions, which when executed by the gaming apparatus processor, cause the gaming apparatus processor to operate with the display device and the input device to:

(a) enable a player to place a wager on a play of a primary wagering game, and (b) display the play of the primary wagering game; and a central server configured to communicate with each of the gaming apparatuses, said central server programmed to:

(a) identify at least one player playing at one of the gaming apparatuses;

(b) for each identified player that placed at least one wager on the play of the primary wagering game of at least one of the gaming apparatuses:

(i) determine if a qualifying activity has occurred in association with said played primary wagering game, and (ii) if the qualifying activity has occurred, associate a quantity of entries for a shared bonus event with the identified player;

(c) for each of a plurality of entries:

(i) distinct from any placement of any wager, enable the identified player to place said entry associated with the identified player in: a first set of entries for a first shared bonus event and a second set of entries for a second shared bonus event, wherein the first set of entries for the first shared bonus event are maintained for a first one of the remote locations, and the second set of entries for the second shared bonus event are maintained for a plurality of the remote locations, and (ii) upon a determination that the identified player has left at least one of the gaming apparatuses, after a set period of time elapses from the determination that said identified player has left at least one of the gaming apparatuses and prior to a selection of any winning entries from the set of entries for the first shared bonus event and the set of entries for the second shared bonus event, cancel said entry associated with the identified player;

(d) select a winning entry from the first set of entries for the first shared bonus event;

(e) cause an individual location award associated with the first shared bonus event to be provided to the identified player associated with the selected winning entry for the first shared bonus event;

(f) select a winning entry from the second set of entries for the second shared bonus event; and (g) cause a multi-location award associated with the second shared bonus event to be provided to the identified player associated with the selected winning entry for the second shared bonus event.

25. The gaming system of claim 24, wherein if the qualifying activity has occurred, said central server is programmed to modify the quantity of entries associated with the identified player for the shared bonus event.

26. The gaming system of claim 25, wherein the quantity of entries is modified based on at least one selected from the group consisting of: the wager placed on the play of the primary wagering game and an outcome generated for the play of the primary wagering game.

27. The gaming system of claim 24, wherein the qualifying activity is at least one selected from the group consisting of: a randomly occurring activity, a designated outcome generated for the play of the primary wagering game, a designated amount placed on the play of the primary wagering game, and a designated amount of time playing the primary wagering games of at least one of the gaming apparatuses.

28. The gaming system of claim 24, wherein said central server is programmed to select at least one of the winning entries based on at least one selected from the group consisting of: a random occurrence, a fixed time interval, a fixed number of primary games played, a designated wager amount placed on the play of the primary wagering game, and a shared bonus event award value.

29. A method of operating a gaming system, said method comprising:

(a) causing at least one central controller to identify at least one player playing one of a plurality of gaming apparatuses, wherein said plurality of gaming apparatuses are located at a plurality of different remote locations;

(b) for each of the plurality of gaming apparatuses:

(i) enabling a player to place a wager on a play of a primary wagering game, and (ii) causing at least one display device to display the play of the primary wagering game;

(c) for each identified player that placed at least one wager on the play of the primary wagering game of at least one of the gaming apparatuses:

(i) determining if a qualifying activity has occurred in association with said played primary wagering game, and (ii) if the qualifying activity has occurred, associating a quantity of entries for a shared bonus event with the identified player;

(d) for each of a plurality of entries:

(i) distinct from any placement of any wager, enabling the identified player to place said entry associated with the identified player in one of: a first set of entries for a first shared bonus event and a second set of entries for a second shared bonus event, wherein the first set of entries for the first shared bonus event are maintained at a first one of the remote locations, the second set of entries for the second shared bonus event are maintained at a second, different one of the remote locations and the player is enabled to place each entry in either set of entries independent of the location of the gaming apparatus in which the player was associated with the entry, and (ii) upon a determination that the identified player has left at least one of the gaming apparatuses after a set period of time elapses from the determination that the identified player has left at least one of the gaming apparatuses and prior to selecting any winning entries from either the set of entries for the first shared bonus event or the set of entries for the second shared bonus event, canceling said entry associated with the identified player;

(e) selecting the winning entry from the first set of entries for the first shared bonus event; and (f) selecting the winning entry from the second set of entries for the second shared bonus event.

30. The method of claim 29, which includes modifying the quantity of entries associated with the identified player for the shared bonus event if the qualifying activity has occurred.

31. The method of claim 30, wherein the quantity of entries is modified based on at least one selected from the group consisting of: the wager placed on the play of the primary wagering game and an outcome generated for the play of the primary wagering game.

32. The method of claim 29, wherein the qualifying activity is at least one selected from the group consisting of: a randomly occurring activity, a designated outcome generated for the play of the primary wagering game, a designated amount placed on the play of the primary wagering game, and a designated amount of time playing the primary wagering games of at least one of the gaming apparatuses.

33. The method of claim 29, which includes selecting at least one of the winning entries based on at least one selected from the group consisting of: a random occurrence, a fixed time interval, a fixed number of primary games played, a designated wager amount placed on the play of the primary wagering game, and a shared bonus event award value.

34. The method of claim 29, which is provided via a data network.

35. The method of claim 34, wherein the data network is an internet.

36. A method of operating a gaming system, said method comprising:

(a) causing at least one central controller to identify at least one player playing at one of a plurality of gaming apparatuses, wherein said plurality of gaming apparatuses are located at a plurality of different remote locations;

(b) for each of the plurality of gaming apparatuses:

(i) enabling a player to place a wager on a play of a primary wagering game, and (ii) causing at least one display device to display the play of the primary wagering game;

(c) for each identified player that placed at least one wager on the play of the primary wagering game of at least one of the gaming apparatuses:

(i) determining if a qualifying activity has occurred in association with said played primary wagering game, and (ii) if the qualifying activity has occurred, associating a quantity of entries for a shared bonus event with the identified player;

(d) for each of a plurality of entries:

(i) distinct from any placement of any wager, enabling the identified player to place said entry associated with the identified player in: a first set of entries for a first shared bonus event and a second set of entries for a second shared bonus event, wherein the first set of entries for the first shared bonus event are maintained for a first one of the remote locations, and the second set of entries for the second shared bonus event are maintained for a plurality of the remote locations, and (ii) upon a determination that the identified player has left at least one of the gaming apparatuses, after a set period of time elapses from the determination that said identified player has left at least one of the gaming apparatuses and prior to a selection of any winning entries from the set of entries for the first shared bonus event and the set of entries for the second shared bonus event, canceling said entry associated with the identified player;

(e) selecting a winning entry from the first set of entries for the first shared bonus event;

(f) causing an individual location award associated with the first shared bonus event to be provided to the identified player associated with the selected winning entry for the first shared bonus event;

(g) selecting a winning entry from the second set of entries for the second shared bonus event; and (h) causing a multi-location award associated with the second shared bonus event to be provided to the identified player associated with the selected winning entry for the second shared bonus event.

37. The method of claim 36, which includes modifying the quantity of entries associated with the identified player for the shared bonus event if the qualifying activity has occurred.

38. The method of claim 37, wherein the quantity of entries is modified based on at least one selected from the group consisting of: the wager placed on the play of the primary wagering game and an outcome generated for the play of the primary wagering game.

39. The method of claim 36, wherein the qualifying activity is at least one selected from the group consisting of: a randomly occurring activity, a designated outcome generated for the play of the primary wagering game, a designated amount placed on the play of the primary wagering game, and a designated amount of time playing the primary wagering game of at least one of the gaming apparatuses.

40. The method of claim 36, which includes selecting at least one of the winning entries based on at least one selected from the group consisting of: a random occurrence, a fixed time interval, a fixed number of primary games played, a designated wager amount placed on the play of the primary wagering game, and a shared bonus event award value.

41. The method of claim 36, which is provided via a data network.

42. The method of claim 41, wherein the data network is an internet.

* * * * *